United States Patent [19]

Merkle

[11] 4,309,569

[45] Jan. 5, 1982

[54] METHOD OF PROVIDING DIGITAL SIGNATURES

[75] Inventor: Ralph C. Merkle, Mountain View, Calif.

[73] Assignee: The Board of Trustees of the Leland Stanford Junior University, Stanford, Calif.

[21] Appl. No.: 72,363

[22] Filed: Sep. 5, 1979

[51] Int. Cl.³ .............................................. H04L 9/00
[52] U.S. Cl. .............................. 178/22.08; 178/22.10; 340/825.34
[58] Field of Search ......... 178/22; 340/149 R, 149 A, 340/152 R; 235/379, 380, 382; 375/2

[56] References Cited

U.S. PATENT DOCUMENTS 4,200,770  4/1980  Hellman et al. .................. 375/2

Primary Examiner—Howard A. Birmiel
Attorney, Agent, or Firm—Flehr, Hohbach, Test, Albritton & Herbert

[57] ABSTRACT

The invention comprises a method of providing a digital signature for purposes of authentication of a message, which utilizes an authentication tree function of a one-way function of a secret number.

4 Claims, 1 Drawing Figure

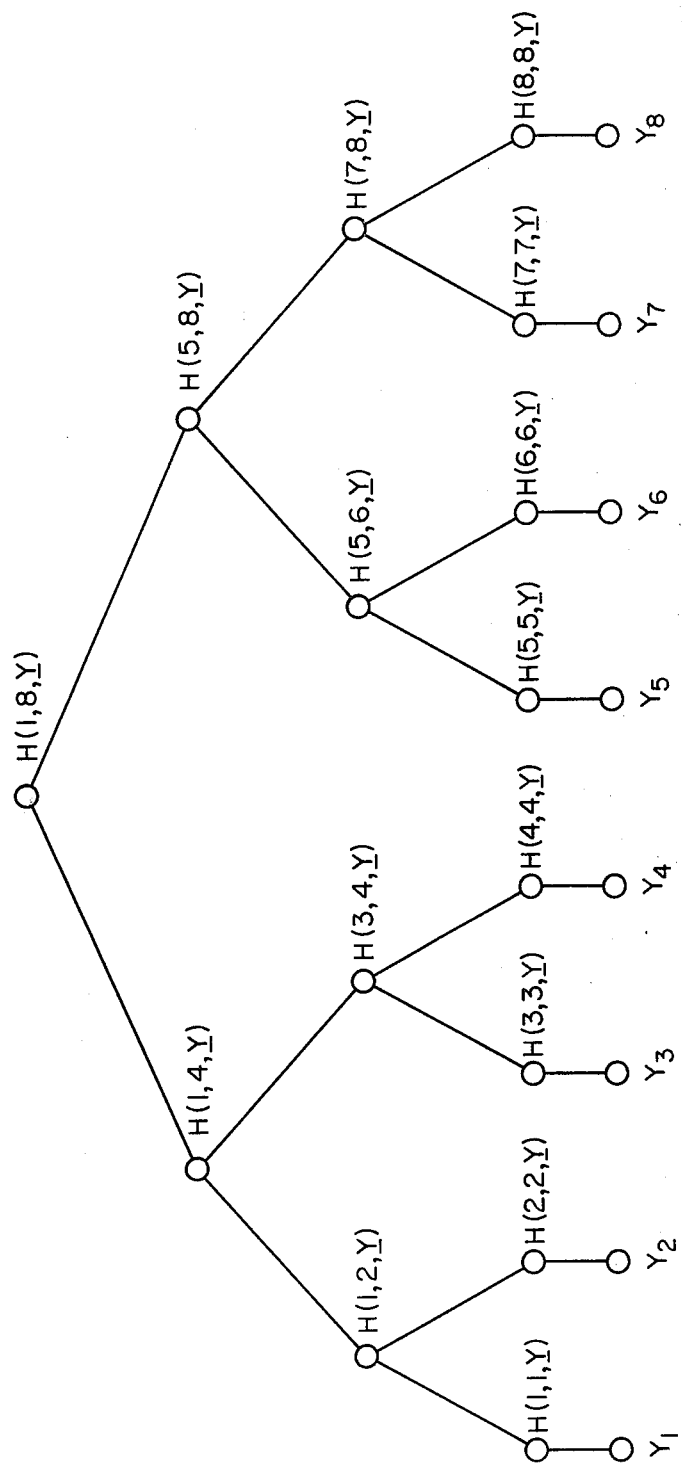
FIG_1

METHOD OF PROVIDING DIGITAL SIGNATURES

The government has rights in this invention pursuant to U.S. Air Force Office of Scientific Research Contract F49620-78-C-0086 and U.S. Army Research Office Contract DAAG29-78-C-0036.

The invention relates to cryptographic systems and more particularly to a method of providing digital signatures.

In conventional paper oriented business transactions, signatures provide a generally accepted level of authentication. But as electronic communication replaces paper oriented business transactions, the need for an electronic or digital signature is created. Currently, most digital message authentication consists of appending an authenticator pattern, known only to the transmitter and intended receiver, to each message and encrypting the combination. This method, however, provides no protection against the problem of disputes between the transmitter and receiver regarding the true content of the message.

Diffie, et al, "New Directions in Cryptography", *IEEE Transactions on Information Theory*, Vol. 1T-22, No. 6, November 1976, pages 644-654, suggested a public key cryptosystem as a means to implement a digital signature and authenticate the true content of the message. But such a system suffers because the use of public key crytosystems to implement digital signatures entails an unknown risk until the security of public key cryptosystems has been carefully certified.

A signature system whose security rested on the security of a conventional cryptographic system would be "pre-certified" to the extent that the underlying encryption function had been certified. The delays and costs of a new certification effort would be avoided. Diffie, et al, supra, suggested such a system, but it has severe performance drawbacks.

The Diffie method is a signature based on the concept of a one way function. If $y=F(x)$ is the result of applying the one way function $F(\ )$ to input x, then the key observation is:

The person who computed $y=F(x)$ is the only person who knows x. If y is publicly revealed, only the originator of y can know x, and can choose to reveal or conceal x at his whim.

In the Diffie scheme, to sign a message m whose size is s bits it is necessary to compute $F(x_1)=y_1$, $F(x_2)=y_2$, ... $F(x_s)=y_s$. The transmitter and receiver would agree on the vector $Y=y_1, y_2, \ldots y_s$. If the $j^{th}$ bit of m was a 1, the transmitter would reveal $x_j$; if the $j^{th}$ bit of m was a 0, the transmitter would not reveal $x_j$. In essence, each bit of m would be individually signed.

The method as described thus far suffers from the defect that the receiver can alter m by changing bits that are 1's into 0's; the receiver may alter m by denying that he ever received $x_j$, in spite of the fact that he did. However, 0's cannot be changed into 1's because the receiver cannot create an $x_j$ that he never received. Diffie et al overcame this problem by signing a new message m', which is exactly twice as long as m and is computed by concactenating m with the bitwise complement of m. That is, each bit $m_j$ in the original message is represented by two bits, $m_j$ and the complement of $m_j$ in the new message m'. Clearly, one or the other bit must be a 0 and is not alterable.

The Diffie et al method is a one time signature; each $Y=y_1, y_2, \ldots y_{2*s}$ can only be used to sign one message. If more than one message is to be signed, then new values where $Y_i = y_{i1}, y_{i2}, y_{i3}, \ldots$ are needed, a new $Y_i$ for each message. One time signatures, as embodied in the Diffie et al method, are practical between a single pair of users who are willing to exchange the large amount of data necessary but they are not practical for most applications without further refinements.

Accordingly, it is an object of the invention to design a digital signature system wherein the security of the system rests on the security of a conventional cryptographic function.

Another object of this invention is to lessen the large storage requirements of the Diffie et al method.

An illustrated embodiment of the present invention describes a method for providing a digital signature of the type which generates a secret number $X_i$, where $X_i = x_{i1}, x_{i2}, x_{i3} \ldots x_{in}$ computes $Y_i = F(X_i)$ and transmits part of $X_i$ to the receiver as the digital signature. The improvement is characterized by defining an authentication tree with an authentication tree function comprising a one way function of the $Y_i$. The root of the authentication tree and the authentication tree function are authenticated at the receiver. The $Y_i$ and the corresponding authentication path values of the authentication tree are transmitted from the transmitter to the receiver. Finally, the $Y_i$ are authenticated at the receiver by computing the authentication path of the authentication tree between the $Y_i$ and the rest of the authentication tree.

FIG. 1 is a diagram of an illustrative authentication tree with a binary tree structure where n is equal to 8.

The receiver must be able to authenticate the transmitter's $Y_i$ values.

The simplest method is for the receiver to store an authenticated copy of all the transmitter's $Y_i$'s, as is done in the Diffie et al method. As described, this method has limited application. It is practical between a pair of users who are willing to exchange a large amount of data for a one time signature. The present invention describes a method called "tree authentication" which can be used to authenticate any $Y_i$ of the transmitter and requires less storage.

The present invention eliminates the large storage requirement. For example, if the transmitter transmits $Y_i$ to the receiver just before signing a message with the corresponding $X_i$, then the receiver will not previously have had to store all the transmitter's $Y_i$'s. Unfortunately, such a protocol by itself would not work because anyone could claim to be the transmitter and send a false $Y_i$. The receiver must be able to confirm that he was sent an authentic $Y_i$ and not a forgery.

To implement a "tree authentication" method for a vector of data items $Y = Y_1, Y_2, \ldots Y_n$ a method is provided to authenticate a randomly chosen $Y_i$. To authenticate the $Y_i$, define the function $H(i,j,Y)$ as follows:

$$H(i,i,Y) = F(Y_i) \tag{1}$$

$$H(i,j,Y) = F(H(i, i+j-1/2, Y), H(i+j+1)/2, j, Y)) \tag{2}$$

where $F(Y_i)$ is a one way function. $H(i,j,Y)$ is a one way function of $Y_i, Y_{i+1} \ldots Y_j$ and $H(1,n,Y)$ can be used to authenticate $Y_1$ through $Y_n$. $H(1,n,Y)$ is a one way function of all the $Y_i$. If $H(1,n,Y)$ is only 100 bits, it can be conveniently stored. This method allows the receiver to selectively authenticate any "leaf", $Y_i$, of the binary "tree" defined with the function $H(i,n,Y)$.

The following example is offered to illustrate a tree authentication where $n=8$. The sequence of recursive calls required to compute the root, $H(1,8,Y)$ of the binary tree is shown in FIG. 1. Once the root $H(1,8,Y)$ is computed, it is authenticated to the receiver along with the function $H(\ )$. To authenticate a $Y_i$ such as $Y_5$, the transmitter and receiver proceed in the following manner:

(1) $H(1,8,Y)$ is already known and authenticated.

(2) $H(1,8,Y)=F(H(1,4,Y), H(5,8,Y))$. Send $H(1,4,Y)$ and $H(5,8Y)$ and let the receiver compute $H(1,8,Y)=F(H(1,4,Y), H(5,8Y))$ and confirm $H(5,8,Y)$ is correct.

(3) The receiver has authenticated $H(5,8,Y)$. Send $H(5,6,Y)$ and $H(7,8,Y)$ and let the receiver compute $H(5,8,Y)=F(H(5,6,Y), H(7,8,Y))$ and confirm $H(5,6,Y)$ is correct.

(4) The receiver has authenticated $H(5,6,Y)$. Send $H(5,5,Y)$ and $H(6,6,Y)$ and let the receiver compute $H(5,6,Y)=F(H(5,5,Y), H(6,6,Y))$ and confirm $H(5,5,Y)$ is correct.

(5) The receiver has authenticated $H(5,5,Y)$. Send $Y_5$ and let the receiver compute $H(5,5,Y)=F(Y_5)$ and confirm it is correct.

(6) The receiver has authenticated $Y_5$.

Using this method, only $\log_2 n$ transmissions are required, each of about 200 bits. Close examination of the method will reveal that half the transmissions are redundant. For example, $H(5,6,Y)$ can be computed from $H(5,5,Y)$ and $H(6,6,Y)$, so there is really no need to send $H(5,6,Y)$. Similarly, $H(5,8,Y)$ need never be transmitted, either. (The receiver must compute these quantities anyway for proper authentication.) Therefore, to authenticate $Y_5$ it is only required that $H(1,8,Y)$ was previously authenticated, and $Y_5$, $H(6,6,Y)$, $H(7,8,Y)$ and $H(1,4,Y)$ were transmitted to the receiver. That is, 100* $\log_2 n$ bits of information are required to authenticate an arbitrary $Y_i$.

The method is called tree authentication because the computation of the root, $H(1,n,Y)$, forms a binary tree of recursive calls. Authenticating a particular leaf $Y_i$ in the tree requires only those values of $H(\ )$ starting from the leaf and progressing to the root, that is, from $H(i,i,Y)$ to $H(1,n,Y)$. $H(1,n,Y)$ is referred to as the root of the authentication tree, or R. The information near the path from R to $H(i,i,Y)$ required to authenticate $Y_i$ is called the authentication path for $Y_i$.

The use of tree authentication is now fairly clear. The transmitter transmits $Y_i$ to the receiver. The transmitter then transmits the authentication path for $Y_i$. The receiver knows R, the root of the authentication tree, and so can then authenticate $Y_i$, and can accept as genuine a message from the transmitter signed with the corresponding $X_i$.

As a further modification of the basic tree authentication method, if the $j^{th}$ user has a distinct authentication tree with root $R_j$ then tree authentication can be used to authenticate $R_i$. It is not necessary for each user to remember all the $R_j$ in order to authenticate them. A central clearinghouse could accept the $R_j$ from all u users, and compute $H(1,u,R)$. This single 100 bit quantity could then be distributed and would serve to authenticate all the $R_j$, which would in turn be used to authenticate the $Y_i$. In practice, the transmitter, A, would remember his root $R_A$ and the authentication path for $R_A$ and send them to the receiver, B, along with $Y_i$ and the authentication path for $Y_i$. Tree authentication and authentication using one time signatures can be intermixed to produce systems with all the flexibility of public key cryptosystems.

There are many methods for implementing the form of the invention. For example, the authentication tree need not be a binary tree but may be a trinary tree where $F'(\ )$ is a one way function having a 300 bit input and a 100 bit output. In general, the authentication tree may have any integer K order of branching where $F'(\ )$ is a one way function having a K:1 ratio of input to output bits. Clearly, the choice of a 200 bit input and a 100 bit output for the one way function, $F(\ )$, of a binary tree is not essential; however, to preserve a constant word size it is desirable that there be a 2:1 ratio of input to output bits in the one way function of a binary tree. If a constant word size is not required, then the ratio of input to output bits in the one way function need not be of the same order as the branching.

The present invention has been described with respect to authentication of signatures. However, its use is not limited to signatures. It may be used to authenticate a piece of information in a list of information, or one item in a list of items.

Thus, although the best mode contemplated for carrying out the present invention has been herein shown and described, it will be apparent that modification and variation may be made without departing from what is regarded to be the invention.

What is claimed is:

1. In a method of providing a digital signature of the type which generates a secret number $X_i$, computes $Y_i=F(X_i)$ where $F(\ )$ is a one way function, authenticates $Y_i$ and $F(\ )$ at the receiver and transmits $X_i$ to the receiver as the digital signature, the improvement characterized by: the step of selecting an authentication tree with an authentication tree function comprising a one way function of the $Y_i$;

authenticating at the receiver the root of the authentication tree and the authentication tree function;

transmitting from the transmitter to the receiver the $Y_i$ and the corresponding authentication path values of the authentication tree; and authenticating the $Y_i$ at the receiver by computing the authentication path of the authentication tree between the $Y_i$ and the root of the authentication tree.

2. In a method of providing a digital signature as in claim 1 wherein the step of:

defining an authentication tree is performed by defining a function $H(i,j,Y)$ such that $$H(i,i,Y)=F(Y_i)$$

and $$H(i,j,Y)=F(H(i,(i+j-1)/2,Y), H((i+j+1)/2,j,Y))$$

where $F(\ )$ is a one way function, i and j are integers less than or equal to n, $Y_i=F(X_i)$ and Y is a vector of data items $Y=Y_1,Y_2,\ldots Y_n$;

authenticating at the receiver is performed by authenticating $H(1,n,Y)$ and the function $H(i,j,Y)$ as the transmitter's root and authentication tree function respectively; and authenticating the $Y_i$ at the receiver is performed by computing the authentication path of the authentication tree between the $Y_i$ and $H(1,n,Y)$.

3. A method of authenticating an item in a list of items comprising the steps of:
- defining an authentication tree with an authentication tree function comprising a one way function of the items in the list;
- authenticating the root of the authentication tree and the authentication tree function; and
- authenticating the item in the list of items by computing the authentication path of the authentication tree between said item and the root of the authentication tree.

4. A method of authenticating an item as in claim 3 wherein the step of:
- defining an authentication tree is performed by defining an authentication tree function comprising a one way function of the roots, R, of u users of a digital signature system; and
- authenticating the item is performed by authenticating the $R_j$ of the $J^{th}$ user by computing the authentication path of the authentication tree between $R_j$ and the root of the authentication tree.

* * * * *